Patented Apr. 16, 1940

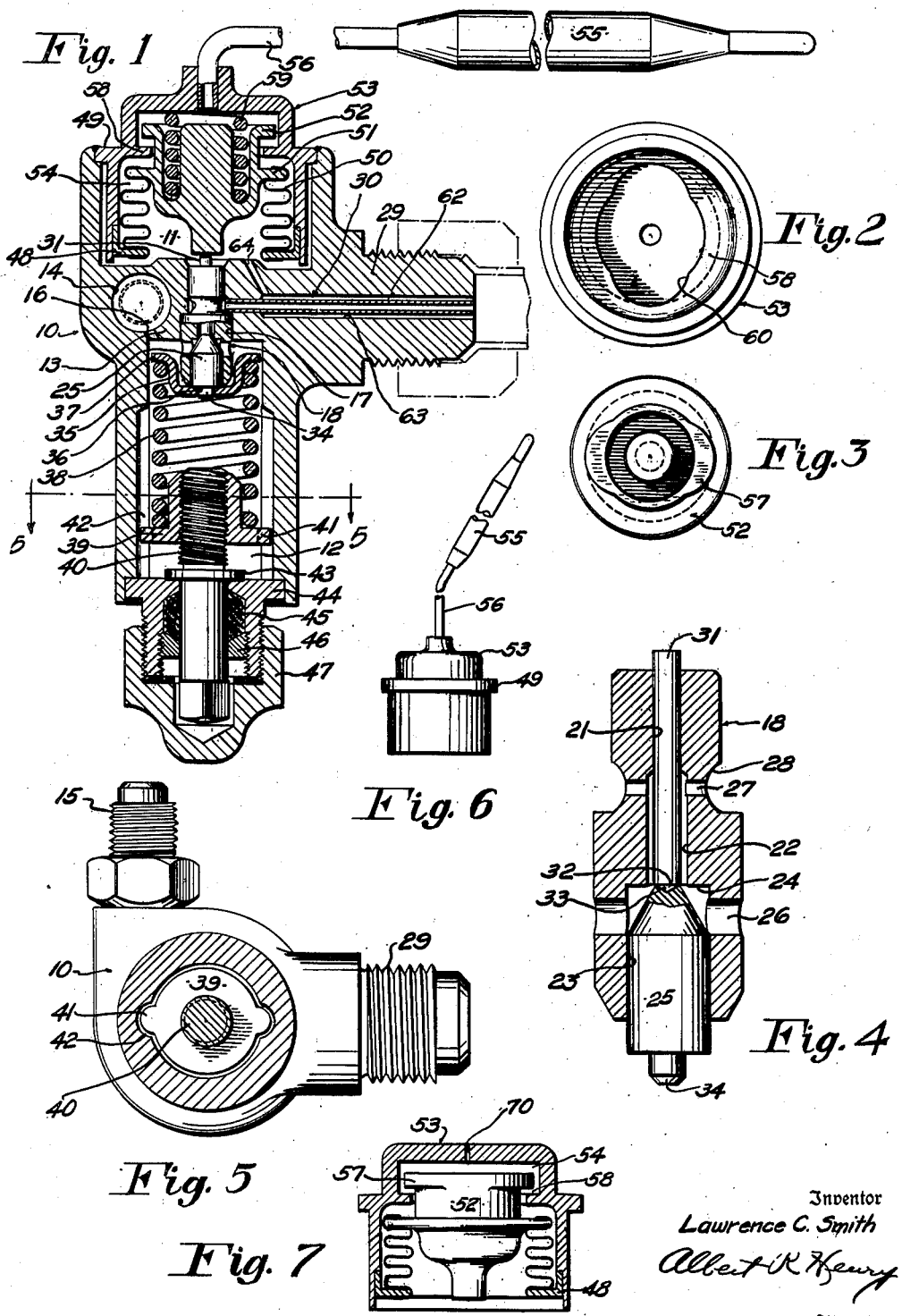

2,197,454

UNITED STATES PATENT OFFICE 2,197,454

BELLOWS ASSEMBLY FOR REFRIGERANT CONTROL VALVES

Lawrence C. Smith, Kenmore, N. Y., assignor to Fedders Manufacturing Company, Inc., Buffalo, N. Y.

Application December 2, 1936, Serial No. 113,877

2 Claims. (Cl. 137—156.5)

This invention relates to refrigerant expansion valves, and it has particular reference to improvements in valves of this type enhancing their economy and efficiency in operation.

Among the objects of the invention are to provide a refrigerant expansion valve in which adjustment of the valve setting may be effected from the "high side" of the refrigeration system, in which a novel valve actuator may be employed, and in which actuating springs may be avoided in the low side of the system, and otherwise to improve the nature of such valves, in modes which will be hereinafter more fully explained and set forth in the appended claims.

A typical valve embodying the present invention is illustrated in the accompanying drawing, wherein:

Fig. 1 is a sectional view of the valve;

Figs. 2 and 3 are plan views of portions of the power element, showing the method of connecting the same;

Fig. 4 is a section, showing in detail and on an enlarged scale the valve and seat construction;

Fig. 5 is a section taken on the line 5—5 of Fig. 1;

Fig. 6 is a side elevation of the power element prior to assembly with the mounting body; and Fig. 7 is a sectional view of a control element which may be used with the valve to form an automatic expansion control.

The elements of the valve are organized with a mounting body 10 which is formed with coaxial bellows and valve chambers 11 and 12 respectively, separated by a partition 13. An inlet passage 14 in the body 10, which may be connected to the high pressure side of a refrigeration system through a connection 15, communicates with the valve chamber 12 through a connecting passage 16.

The partition 13 is formed with an axial opening 17 which serves to receive a seat member 18. As shown in Fig. 4, this member is formed with three axial holes 21, 22, 23 of progressively larger diameters. The hole 22 defines an internal shoulder 24 which serves as a seat for a valve needle 25 which is slidably mounted in the hole 23. Radial holes 26 in this portion of the seat member provide communication between the seat 24 and the chamber 12. The seat member contains radial holes 27 leading into the axial hole 22 and terminating in an external circular groove 28, which in turn communicates with an outlet passage 30 terminating in a fitting portion 29 which may receive suitable connections for attachment to an evaporator of a refrigeration system.

The upper axial hole 21 serves as a bearing for an actuator pin 31, whose upper end extends therefrom into the bellows chamber 11. The lower end of the pin projects through the hole 22, and its terminal portion 32 is received in a socket 33 formed in the tip of the valve needle 25. It will be apparent that a force applied to the pin 31 will unseat the valve needle, whereupon refrigerant will enter the hole 22 about the pin and finally be directed to the outlet passage 30.

Adjustable means are provided for retaining the valve needle in seated position, comprising a saddle member 35 having a central hole 36 for receiving a reduced pin portion 34 formed on the needle 25 and an upwardly extending annular portion providing a spring seat 37 for one end of a compression spring 38. The remaining end of the spring is seated on a nut 39 which is tapped to receive a threaded adjusting stem 40. Rotating movement of the nut is prevented by keys 41 formed thereon, which engage in opposed keyways 42 on the wall of the chamber 12 (Fig. 5). The stem 40 is formed with a shouldered portion 43 which bears against a cap 44 which is soldered to the open end of the chamber 12. The cap contains a gland structure including a packing 45 and a gland nut 46 through which remaining portions of the stem 39 project. A cap nut 47 is secured to the exterior of the cap, and it contains a gasket which engages the end of the cap and thus provides an additional seal against leakage of refrigerant from the chamber 12.

The valve, as thus far described, may be organized with various types of control instrumentalities which may operate directly on the protruding actuating pin 31. In Fig. 1, for example, it is combinted with a thermostatic element to provide a thermostatic expansion valve. This unit comprises a bellows 50 which is secured to an annular member 48 at one extremity, and to the radial flange 51 of a head 52 at its remaining extremity. A casing 53 encloses these elements, and the member 48 is soldered to the lower end thereof, thus forming a sealed thermostatic chamber 54. A thermostatic bulb 55 communicates with the chamber 54 through a tube 56. A circular mounting flange 49 is formed on the exterior of the casing 53.

It is preferred that the thermostatic unit be of a unitary structure so that it may be handled or shipped separately without danger of rupture of the bellows under adverse temperature conditions. To prevent excessive collapsing of the bellows, a stop structure is provided by forming a pair of opposed ears 57 on the upper end of the head 52 (Fig. 3) which are engageable with an underlying internal flange 58 formed in the casing 53. The flange 58 is formed with an orifice 60 (Fig. 2) which is adapted to permit passage of the upper end of the head 52, including the ears 57, therethrough. A compression spring 59 may be disposed between the head 52 and the casing 53.

To assemble the thermostatic unit, the head 52, bellows 50, and annular member 48 are first soldered together, and then inserted in the casing 53 with the upper end of the head inserted through the orifice 60 of the casing. The head and casing are then relatively rotated to position the ears 57 over the flange 58 of the casing, whereupon the member 48 is soldered to the casing to fix the elements in this position. Thus, it will be observed that the head 52 and casing 53 are connected by a joint of the bayonet type.

To assemble the thermostatic unit with the valve body 10, it is inserted in the bellows chamber 11 and the mounting flange 59 is then soldered to the extremity of the body. When thus positioned, the lower end of the head 52 is adapted to contact the projecting actuating pin 31 upon collapse of the bellows under pressure, thus permitting the valve to be operated by the thermostatic element.

To protect the thermostatic chamber from a too rapid heat exchange action with the expanding refrigerant delivered through the passage 30, a small tube 62 is inserted in the passage 30 to convey the refrigerant to the extremity of the fitting portion 29. The passage 30 is formed with an enlarged counter-bore 63 for a substantial distance, so that the tube 62 only contacts a small section of the body adjacent to the seat member 18. The bellows chamber 11 communicates with the counterbore 63 through a drainage hole 64 which prevents oil, which may escape past the pin 31, from accumulating therein. Through the provision of the tube 62, the refrigerant is prevented from expanding in its passage from the valve body. In addition, direct thermal contact between the tube and body is retained at a minimum, to the end that the body is retained at a somewhat higher temperature than the evaporator portions of the refrigeration system.

The thermostatic expansion valve above described may be converted into an expansion or pressure responsive valve by simply omitting the thermostatic bulb and tube and providing a heavier spring 59. In operation of this valve, the force exerted by the adjusting spring 38 plus the force of the refrigerant pressure within the bellows 50 will oppose the combined forces of the spring 59 and atmospheric pressure on the opposite side of the bellows. Thus, upon proper adjustment of the spring 38, the valve may be caused to open automatically in response to any desired refrigerant pressure.

I prefer, however, to eliminate the spring 59 by charging the chamber 54 with several atmospheres of air or other gas which is incondensible at the operating temperatures of the system. As shown in Fig. 7, the gas may be introduced through an opening 70 in the casing 53. Aside from saving a spring and the troubles which attend the use of a spring, an operating advantage is obtained with the compressed air charge, wherein the expansive effects of higher temperatures on the air charge will raise its pressure slightly, and thus upon commencement of the compressor cycle it will aid the valve to open more rapidly, so that refrigerant may be promptly delivered to the evaporator portions of the system.

I claim:

1. A bellows assembly adapted to constitute a control element for an automatically responsive refrigerant valve comprising a bellows, a casing, said bellows being secured at one end thereof to said casing, a flange on said casing extending inwardly therefrom, said flange being formed with an aperture of varying diameter whereby the aperture, at certain portions thereof, is of greater diameter than at other portions, a head member connected to the other end of the bellows, said head member having an end portion adapted to extend through said aperture, said end portion being formed with a reduced neck freely fitting in said aperture when the head, casing, and bellows are assembled in operative relation, the extremity of said end portion having different diameters, one of which is greater than the minimum diameter of said aperture, and none of which is greater than the maximum diameter of said aperture, whereby said end portion may be passed through said aperture when the greater diameter of the end portion is aligned with the maximum diameter of said aperture, but is held from axial withdrawal upon rotation of the head within said aperture, said head being so rotated in the assembly, the said reduced neck terminating in a radial flange of greater diameter than said aperture.

2. A bellows assembly adapted to constitute a control element for an automatically responsive refrigerant valve comprising a bellows, a head secured to one end of said bellows, a casing secured to the other end of said bellows, said head being formed with a portion extending laterally toward said casing, said head and portion being bodily movable with said bellows, and with respect to said casing, when the bellows is extended and contracted, said portion and casing being formed with portions of irregular outline, said portions overlapping each other and contacting each other to form a limit stop upon predetermined movement of the bellows with respect to the casing, said portions, in the course of assembly, being relatively rotatable and freely movable past each other when so rotated.

LAWRENCE C. SMITH.